United States Patent [19]
Bear

[11] 3,833,039
[45] Sept. 3, 1974

[54] QUICK MOUNT TIRE CHAINS
[76] Inventor: Clarence Bear, 12720 S.W. Prince Albert, Tigard, Oreg. 97223
[22] Filed: Mar. 22, 1973
[21] Appl. No.: 343,783

[52] U.S. Cl. ............................................. 152/241
[51] Int. Cl. ......................................... B60c 27/06
[58] Field of Search ........... 152/213, 241, 239, 231, 152/217, 218, 219

[56] References Cited
UNITED STATES PATENTS
2,207,971  7/1940  Chaussee ..................... 152/213 R
2,436,709  2/1948  Bozenhard et al. ................. 152/241
3,095,025  6/1963  Rhodes ............................... 152/241

Primary Examiner—James B. Marbert
Attorney, Agent, or Firm—Klarquist, Sparkman, Campbell, Leigh, Hall & Whinston

[57] ABSTRACT

A quick mount tire chain has a pair of levers or bars each connected to a pair of end cross chains and lying against the side wall of a tire, and having eyes to receive cross ties.

17 Claims, 5 Drawing Figures

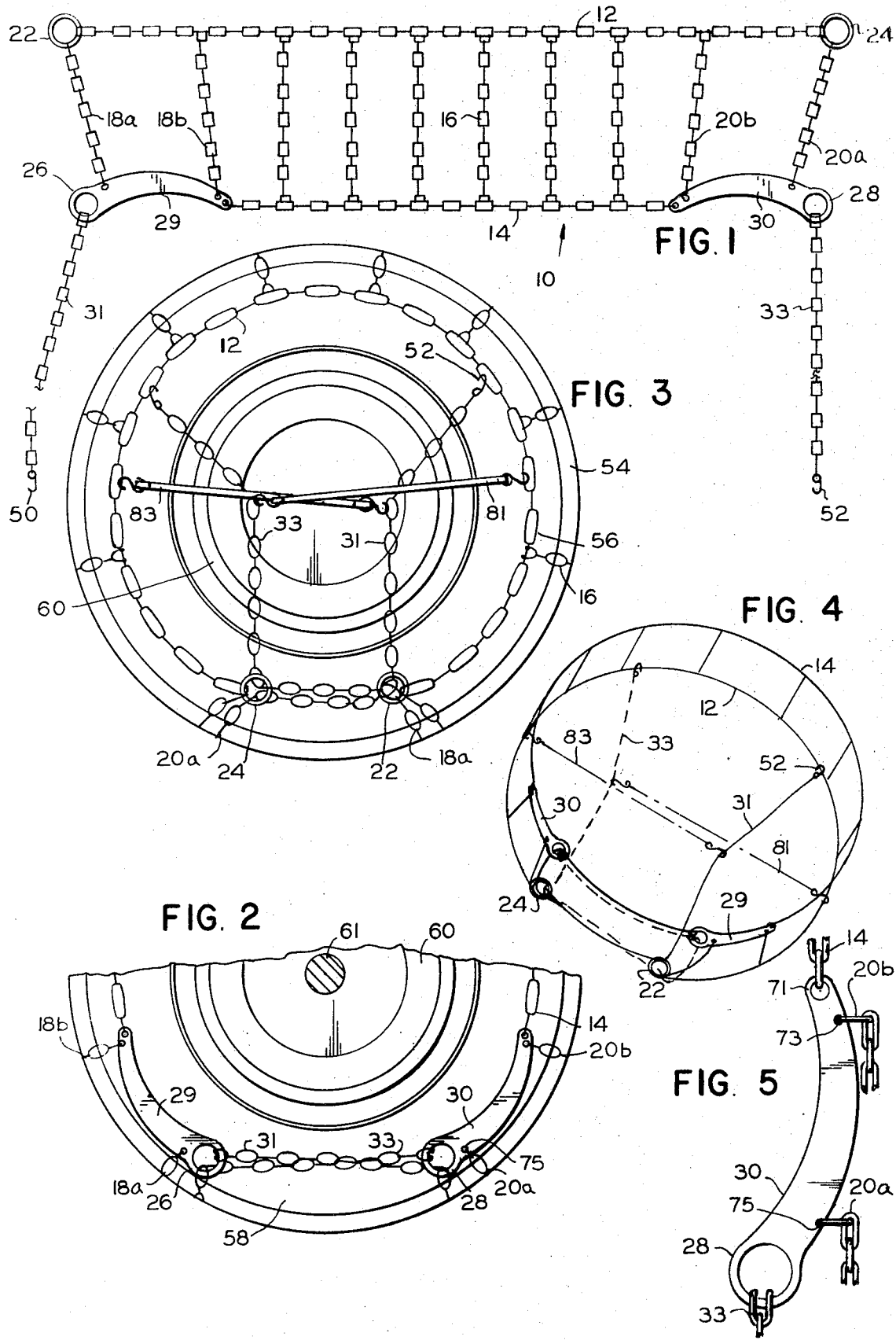

QUICK MOUNT TIRE CHAINS

DESCRIPTION

This invention relates to and has as an object the provision of an improved tire chain.

Another object is to provide a tire chain which (1) can be provided in a few sizes to readily adapt to a larger range of tire sizes; (2) has end levers or bars which facilitate application and securement of the chain to a tire without foul ups or hang ups, and specifically ensures proper routing of cross ties and the removal of slack in cross ties before cinching up, and the maintenance of the generally taut condition of the cross ties during the cinching up operation to prevent the development of slack; (3) has end levers or bars so connected to cross chains that a lever action urges the free ends of the bars or levers toward one another to positions making it less likely for slack to develop during the cinching operation.

A further object is to provide a tire chain having elongated, arcuate eye members connected to the ends of a side chain and adapted to lie against a side of a tire.

In the drawings:

FIG. 1 is a top plan view of an improved tire chain forming one embodiment of the invention, laid out in the condition it would assume just prior to application to a tire;

FIG. 2 is a side elevational view of the inner face of the tire, with the tire chain of FIG. 1 mounted thereon;

FIG. 3 is a side elevation view of the outer face of a tire with the tire chain mounted thereon;

FIG. 4 is a schematic perspective view better showing the routing of the cross ties; and FIG. 5 is a fragmentary view of a lever in dangling position.

Referring now in detail to the drawings there is shown a tire chain 10 forming one embodiment of the invention including an outer side chain 12 and an inner side chain 14, intermediate cross chains 16, end cross chains 18a and 20a and penultimate cross chains 18b and 20b. There are eyes or rings 22 and 24 on the ends of the outer side chain 12. Inner eyes 26 and 28 are provided by the ends of two planar eye members 29 and 30 in the form of rigid plates. The eye members define levers or bars. The inner tire chain also includes two cross ties or connecting chains 31 and 33 having end hooks 50 and 52.

FIGS. 2 and 3 show the chain mounted on a vehicle wheel having a tire 54 having an outer side wall 56 and an inner side wall 58 and a wheel proper 60. An axle 61 for the wheel is more or less symbolically shown.

Preferably the eye members 29 and 30 are curved or arcuate as shown to follow the contour of the side wall of the tire so as to more readily lie flat against the tire. The eyes 29 and 30 are rounded so that they have a sled-like action if they touch the ground, and the elongated, flat shape of the eye members keep them from getting under the tread portion of the tire in the event that looseness should occur.

The inboard end of each eye member has a hole 71 to which is connected the adjacent ends of the inner side chain 14. Each eye member also has a slot 73 to receive the adjacent ends of the adjacent penultimate cross chains. Adjacent the outboard there is a similar opening 75 to receive the end of the end cross chain.

In mounting the tire chain on the tire 54, the chain is placed on top of the tire with the inner side chain 14 and the cross ties 30 and 31 at the inner side of the tire. At this time, the eye members 29 and 30 hang downwardly and tend to dispose themselves to point inwardly toward each other to positions not too much different from those disclosed in FIG. 2. The cross tie 31 is then thrown from left to right as the parts are shown in FIGS. 1 and 2 behind the tire, whereas the other cross tie 33 is thrown from the right to the left as the parts are shown in FIG. 2.

Then cross tie 31 is passed through the eye 28 of lever 30 and cross tie 33 is passed through the eye 26 of level 29. Then the slack in the cross ties is removed by pulling on them horizontally. Then the cross ties are pulled under the tire (see FIG. 2), and at the outer side of the tire each is passed through both rings 22 and 24 and then pulled upwardly and hooked by hooks 50 and 52 onto links of the outer side chain 12 at places to leave no slack in the cross ties, or at least the minimum amount of slack reasonably possible. Preferably elastic tensions 81 and 83 are hooked between the cross ties and the side chains 12 at places between the hooks 50 and 52 and the eyes 22 and 24 to maintain the chain in taut embracing condition on the tire.

In the preferred form of the invention I also provide levers or bars in the outer side chain 12 to make it easier to eliminate any slack or hang up of the cross ties, although if it did occur it could be seen, while it could not be if it occurred at the inner side of the tire.

As previously mentioned, the levers 29 and 30, when dangling free on the tire after the chain 10 has been placed thereon, tend to assume positions pointing somewhat inwardly toward one another (away from the tread of the tire) as shown in FIG. 5 for lever 30. I believe that this inward hang tendency aids in preventing the development of slack and hang ups of the cross ties.

The levers also insure proper routing of the cross ties. In my previous chains having chain supported eyes, the public, on occasion, routed the cross ties in unwanted ways to foul up proper mounting of the chain on a tire.

While I show elastic tighteners 81 and 83, the cross ties, being now elastic, assure that the centrifugal forces acting on the chain during travel of the related vehicle will not cause any substantial loosening of the chain on the tire.

I prefer that the levers or bars 29 and 30 have a flat plate-like form, as this tends to cause the levers to naturally assume their proper positions lying flatwise against the inner side wall of the tire 54, with the outer faces of the levers exposed and the inner faces next to the tire.

The chain of my invention can be readily adapted to dual wheels by adding another side chain like 12, but on the other side of chain 14, and connected to chain 14 by cross chains. The third side chain could have any convenient means for effecting a simple tying together of its ends without routing under the inner tire. Shorter tie chains and eyes could be used.

What is claimed is:
1. In a tire chain:
an outer side chain having connecting means at the ends thereof, an inner side chain,
a plurality of cross chains connected to the inner and outer side chains at points spaced therealong,
a connecting chain,
means connecting the connecting chain to one end of the inner side chain,
and an elongated rigid eye member having an eye portion at one end and connected at its other end directly to the other end of the inner side chain,
the eye member being curved and connected to the inner side chain so as to normally hang from the inner side chain in a position in which the eye member extends along the inner face of the tire toward said one end of the inner side chain,
a cross chain connected to the outer side chain and the eye member at a point intermediate of the ends of the eye member,
the connecting chain being adapted to pass through the eye portion, extend across the tire and to connect to the outer side chain.

2. The tire chain of claim 1 wherein the next to last cross chain is connected directly to the eye member.

3. The tire chain of claim 2 wherein the eye member is a rigid, arcuate plate.

4. The tire chain of claim 3 wherein the next to last cross chain is connected to the plate between the portions of the plate to which the last cross chain is connected and the inner side chain is connected.

5. The tire chain of claim 2 wherein the next to last cross chain is connected to the eye member between the portion of the eye member connected to the inner side chain and the portion of the eye member connected to the last cross chain.

6. The tire chain of claim 1 wherein the eye member is a rigid plate having an enlarged end portion having a hole therethrough forming the eye portion of the eye member.

7. The tire chain of claim 1 wherein the eye member is a rigid plate.

8. The tire chain of claim 1 including a second connecting chain connected to the eye member, and a second eye member having an eye portion and connected to said one end of the inner side chain and to the first mentioned connecting chain,
the second connecting chain being adapted to pass through the eye portion of the second eye member, extend across the tire and to connect to the outer side chain.

9. The tire chain of claim 3 wherein the plate has an arcuate shank portion of a predetermined maximum width and an eye portion of a diameter substantially larger than said width.

10. In a tire chain,
an outer side chain having connecting means at the ends thereof,
an inner side chain,
a plurality of cross chains connected to the inner and outer side chains at points spaced therealong,
a connecting chain,
means connecting the connecting chain to one end of the inner side chain,
and an elongated rigid eye member having an eye portion at one end and connected at its other end directly to the other end of the inner side chain,
the eye member being substantially planar so as to normally lie flat against a side of a tire,
the connecting chain being adapted to pass through the eye portion, extend across the tire and to connect to the outer side chain.

11. The tire chain of claim 10 wherein at least one of the cross chains is connected directly to the eye member.

12. The tire chain of claim 11 wherein said one of the cross chains is connected to the eye member at a point on the eye member such that when the tire chain is placed on top of the tire, the weight of said one of the cross chains tends to hold the eye member in a position extending toward said one end of the inner side chain.

13. The tire chain of claim 10 wherein at least two of the cross chains are connected directly to the eye member.

14. The tire chain of claim 10 wherein the eye member is a rigid, arcuate plate.

15. In a tire chain,
a first side chain having a first pair of eye means at the ends thereof,
a second side chain having a second pair of eye means at the ends thereof,
a plurality of cross chains connected to the first and second side chains at points spaced therealong,
a pair of connecting chains connected to the second eye means,
each of the connecting chains passing through one of the second pair of eye means extending directly transversely across the tire, passing sequentially through the first pair of eye means and connected to the first side chain.

16. The tire chain of claim 1 wherein the portion of the eye member extending from the eye portion thereof defines an easily held handle portion.

17. In a tire chain:
an outer side chain having connecting means at the ends thereof,
an inner side chain,
a plurality of cross chains connected to the inner and outer side chains at points spaced therealong,
a pair of elongated, unstretchable eye members each having an eye portion at one end and connected at its other end directly to one end of the inner side chain,
and a pair of connecting chains connected directly to the eye portions of the eye members,
the eye members being curved and connected to the ends of the inner side chain so as to normally hang from the inner side chain in positions in which the eye members extend along the inner face of the tire toward said each other,
each of the connecting chains being adapted to pass through the eye portion of the eye member to which that chain is not connected, extend across the tire and connect to the outer side chain,
the portions of the connecting chains between the eye members forming double inner side chain tensioning elements between the eye portions so that, by pulling both connecting chains, the entire inner side chain is tensioned.

* * * * *